United States Patent Office 3,658,740
Patented Apr. 25, 1972

3,658,740
PRESSURE SENSITIVE ADHESIVES
Oren L. Marrs, Bartlesville, Okla, and Billy D. Simpson, Akron, Ohio, assignors to Phillips Petroleum Company
No Drawing. Filed Dec. 5, 1969, Ser. No. 882,697
Int. Cl. C09j 3/26
U.S. Cl. 260—27                                    7 Claims

ABSTRACT OF THE DISCLOSURE

Adhesive compositions are prepared by combining branched block copolymers with linear block copolymers or block copolymers, tackifiers, and organic solvents.

---

This invention relates to a new adhesive composition. In another aspect this invention relates to a versatile new adhesive for bonding various different materials together. More specifically this invention relates to a cementing or adhesive composition comprising a branched block copolymer, a block or a linear block copolymer, and a tackifier in an organic solvent which is useful in bonding a variety of like or unlike surfaces together.

Many adhesive and cementing compositions have been suggested in the art for bonding materials such as rubber, wood, metal, painted objects, plastic, paper, fabric, and the like, to each other or other materials. Various types of polymers have been suggested for use in adhesive recipes to accomplish these goals, but the majority of the polymers developed by the prior art have not been completely satisfactory, particularly in relation to creep resistance.

An object of this invention is to provide an adhesive composition of superior creep resistance with satisfactory peel strength and tack.

Other aspects, objects and advantages of this invention will be apparent to those skilled in the art upon careful study of the following specification, examples, and appended claims.

We have now discovered that an adhesive composition having superior creep resistance, even at elevated temperatures, with satisfactory peel strength and tack which is useful for and capable of satisfactorily bonding a variety of films to a variety of substrates can be prepared by blending a first copolymer, a second copolymer, a tackifier and an organic solvent.

The first copolymer is a branched block copolymer having at least three block copolymer branches radiating from a nucleus. The second copolymer is one selected from the group consisting of block copolymers and linear block copolymers. The tackifier is a resinous material, and the solvent is an organic solvent.

The weight ratio of the first copolymer to the second copolymer generally is within the range of about 0.05:1 to 20:1, preferably being within the range of about 0.3:1 to 3:1.

The weight ratio of the combined weights of the first and second copolymers to the weight of the tackifier generally is within the range of about 0.05:1 to 20:1, preferably being within the range of about 0.3:1 to 3:1.

The solvent generally will be used in an amount such as to provide a solution or dispersion containing about 40–90 weight percent solvent.

When the various components of the adhesive composition of this invention are blended together the order of mixing is not critical; in fact, one can measure each component into an apparatus suitable for blending in any desired order accompanied by mixing, or mixing can be deferred until all components have been introduced into a mixing apparatus. Mixing can proceed by any method known in the art for mixing viscous material, and mixing should continue until the solution viscosity assumes a constant value. The adhesive compositions prepared herein were mixed at room temperature for about 24 hours. All the materials were placed in an apparatus and the entire apparatus was tumbled. This technique was entirely successful in obtaining a uniform solution. Subsequent to mixing, the adhesive solution should be used within 2 or 3 days.

The branched block copolymers used in the adhesive composition of this invention are comprised of conjugated dienes and monovinyl substituted aromatic compounds and have at least three relatively long block copolymer branches which radiate from a nucleus. The terminal polymer block segments on each of the branches are composed of the monovinyl-substituted aromatic compound. Therefore, the term "branched block copolymer" as used herein is intended to mean copolymers having the general formula $$Z(-CD)_n$$

wherein each D group is a terminal block segment comprising essentially vinyl aromatic units, each C group is a connecting polymer block segment comprising essentially conjugated diene units, the Z group is derived from a polyfunctional compound having at least three reactive sites, and $n$ is not less than three.

The first copolymer, a branched block copolymer as herein defined, must have at least three block copolymer branches radiating from a nucleus. Each of the block copolymers in each branch has at least two polymer block segments made from conjugated dienes and vinyl aromatic compounds.

The relative amounts of the vinyl-substituted aromatic compound and the conjugated diene used in producing the branched block copolymers described above can vary over a wide range. The amount of conjugated diene present in the branched block copolymer can be present in the range from 40 to 95 parts by weight per 100 parts by weight of the branched block copolymer. The vinyl-substituted aromatic compound can be present in the range of from 5–60 parts by weight per 100 parts by weight of the branched block copolymer. Preferably, the conjugated diene will be present in an amount of from 50 to 90 parts by weight per 100 parts by weight of the branched block copolymer.

The amount of vinyl-substituted aromatic compound that is present as terminal polymer block segments in the branched block copolymers used in this invention can vary over a wide range. It is desirable that the terminal polymer block segments comprise the vinyl-substituted aromatic compound to the extent of at least 5 percent by weight of the branched block copolymer.

The vinyl-substituted aromatic compound can be polymerized for a period of time to produce a polymer block segment of the vinyl-substituted aromatic compound of sufficient size followed by a second polymerization step wherein the conjugated diene is polymerized. In some instances it may be desirable to allow all of the vinyl-substituted aromatic compound to be polymerized before adding the conjugated diene for the second polymerization step. In other instances, any unreacted vinyl-substituted aromatic compound can be removed from the polymerization mixture followed by the addition of the conjugated diene for the second polymerization step. And in still other instances, any unreacted vinyl-substituted aromatic compound may be left in the polymerization system and the conjugated diene can be added for the second polymerization step. In the latter instance, the polymer block segments formed in the second polymerization step may contain both conjugated diene monomer units and vinyl-substituted aromatic monomer units.

It is preferable that the terminal polymer block segments on the branched block copolymer be homopolymer blocks of the vinyl-substituted aromatic compound. However, it is also within the scope of this invention to utilize branched block copolymers with terminal polymer block segments that are predominantly vinyl-substituted aromatic polymers with minor amounts of the conjugated diene monomer units. When the terminal polymer blocks are composed of both vinyl-substituted aromatic units and conjugated diene units, the conjugated diene comprises less than 20 parts by weight for each 100 parts by weight of the terminal polymer block, with the vinyl-substituted aromatic comprising the remainder.

The vinyl-substituted aromatic compounds that can be used in producing branched block copolymers for use in the adhesive composition of this invention can have up to about 24 carbon atoms per molecule and include: styrene, 1-vinylnaphthalene, 2-vinylnaphthalene and the alkyl, cycloalkyl, aryl, alkaryl, and aralkyl derivatives thereof. Examples of such substituted monomers include: α-methylstyrene, 3-methylstyrene, 4-n-propylstyrene, 4-cyclohexylstyrene, 3-phenylstyrene, 4-dodecylstyrene, 2-ethyl-4-benzylstyrene, 4-p-tolylstyrene, 4-(4-phenyl-n-butyl)styrene, 3,6-di-n-hexyl-1-vinylnaphthalene, and the like.

The conjugated dienes used in the production of branched block copolymers for incorporation in the adhesive receipes of the invention are those which contain from 4 to 12 carbon atoms per molecule. The conjugated dienes containing from 4 to 8 carbon atoms are preferred. Examples of such compounds include 1,3-butadiene, isoprene, 2,3-dimethyl-1,3-butadiene, piperylene, 1,3-octadiene, 3-butyl-1,3-octadiene, 1-phenyl-1,3-butadiene and the like.

The above referred to "Z" group which forms the nucleus from which the polymer blocks of the branched block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. As will be hereafter described, the polymer block segments are polymerized in the presence of an organomonolithium initiator. It is preferred that the amount of polyfunctional compound utilized be 1.0 equivalent per equivalent of carbon-lithium in the polymer for maximum branching. Reference to U.S. 3,281,383 will reveal further details of the polyfunctional compound useful in the formation of the branch block copolymers.

The branched block copolymers can be formed by any method known in the art, such as the method set out in U.S. 3,281,383. Briefly, this method of forming the branched block copolymers is as follows. The vinyl-substituted aromatic compound is polymerized first in the presence of an organomonolithium initiator. After the vinyl-substituted aromatic compound has been polymerized to form the initial polymer block, the conjugated diene can be added to the polymerization mixture to produce a block copolymer of the conjugated diene and the vinyl-substituted aromatic compound. By the procedure of polymerizing the vinyl-substituted aromatic compound first, followed by the addition of the conjugated diene compound, a block copolymer having a terminal lithium atom is formed. The lithium atom will be at the end of the conjugated diene polymer block. The lithium-terminated block copolymer is called a "living polymer" because of the presence of the lithium atom at the end of the conjugated diene polymer block. The living polymer can then be conveniently reacted with a polyfunctional compound having at least three reactive sites that are capable of reacting with the carbon-lithium bond of the living polymer. By regulating the amounts of the living polymer and the amounts of the polyfunctional compound, it is possible to produce a branched block copolymer having at least three relatively long polymer branches extending outwardly from the nucleus. The nucleus or hub is formed by the polyfunctional compound which reacted with the lithium-terminated polymer. In order to produce the branched block copolymers having at least three polymer branches, it is essential that the polyfunctional compound have at least three reactive sites that are capable of reacting with the carbon-lithium bond of the living polymer.

To achieve maximum branching the optimum amount of polyfunctional compound that is reacted with the living polymer will be an amount of polyfunctional compound that contains one equivalent of treating agent for each living polymer molecule. In other words, each reactive site on the polyfunctional compound will react with a carbon-lithium bond in the living polymer. Larger amounts of the polyfunctional compound encourage the production of polymers that are coupled in a linear configuration instead of being branched. When equivalent amounts of the polyfunctional compound and the living polymer are reacted, the final product comprises a branched polymer in which the polymer chain is joined at one end to each reactive site of the treating agent.

Since the branched block copolymers used in the adhesive composition of this invention preferably contain terminal homopolymer blocks of the vinyl-substituted aromatic compound, it is necessary that the vinyl-substituted aromatic compound be polymerized first when an organomonolithium initiator is used to form the block copolymer. After the vinyl-substituted aromatic compound has been polymerized to the desired length, any unreacted vinyl-substituted aromatic compound can be removed. The conjugated diene is then added to the polymerization mixture and the polymerization is continued until the conjugated diene has been polymerized to the desired amount. The living polymer of the vinyl-substituted aromatic compound and the conjugated diene thus formed can then be reacted with the polyfunctional compound to produce the branched block copolymer. In some instances, it may be desirable to form other polymer blocks before the living polymer is reacted with the polyfunctional compound. This is very easily accomplished by simply adding additional monomer increments to produce additional polymer blocks before the living polymer is reacted with the polyfunctional compound. Thus, it is possible to produce block copolymers having 2,3, or more separate and distinct polymer blocks by the above procedure.

The second copolymer of the adhesive composition of this invention is one selected from the group consisting of block copolymers and linear block copolymers. The block copolymers and linear block copolymers useful herein are made from conjugated dienes and vinyl aromatic compounds. Preferably about 40–90 parts by weight per 100 parts by weight of the respective copolymers is derived from the conjugated diene with the remaining 10–60 parts by weight being derived from the vinyl-substituted aromatic compound.

As used herein the term "block copolymer" is intended to mean copolymers having the general formula

AB wherein each A group is a block segment comprising a homopolymer of a vinyl-substituted aromatic hydrocarbon and each B group is a block segment comprising a copolymer of a conjugated diene and a vinyl-substituted aromatic hydrocarbon.

The block copolymers of this invention are to be distinguished from random copolymers by the fact that the final product is made up of a polymer chain of two different block segments joined end to end. One of the block segments forming the block copolymer is a copolymer of a conjugated diene and a vinyl-substituted aromatic hydrocarbon, wherein less than 10 percent by weight of this copolymer block segment is derived from the vinyl-substituted aromatic hydrocarbon. The second block segment is, essentially, a homopolymer of a vinyl-substituted aromatic hydrocarbon. Conjugated dienes having 4 to about 12 carbon atoms per molecule, and vinyl-substituted aromatic hydrocarbons having no more than about 24 carbon atoms per molecule can be used to prepare the block copolymers used in this invention. The preferred conjugated dienes include 1,3-butadiene, isoprene, and piperylene. Other conjugated dienes which can be used include 2,3 - dimethyl - 1,3 - butadiene, 1,3-octadiene, 3 - butyl - 1,3 - octadiene, 1-phenyl-1,3-butadiene, and the like. The vinyl-substituted aromatic hydrocarbons which can be employed include styrene, divinylbenzene, 1 - vinylnaphthalene, 2 - vinylnaphthalene and alkyl, cycloalkyl, aryl, alkaryl, and aralkyl derivatives thereof such as α-methylstyrene, 3 - methylstyrene, 4-cyclohexylstyrene, 3 - phenylstyrene, 2 - ethyl - 4 - benzylstyrene, 4-p-tolylstyrene, and 3-dodecyl-1-vinylnaphthalene.

The block copolymers used in this invention can be prepared by any method known in the art, such as by the method described in British Pat. 888,624.

As used herein, the term "linear block copolymer" is intended to mean copolymers having the general formula

ABA wherein each A group is a block segment comprising a homopolymer of a vinyl-substituted aromatic hydrocarbon, and each B group is a block segment selected from the group consisting of a homopolymer of a conjugated diene and a copolymer of a conjugated diene and a vinyl-substituted aromatic hydrocarbon.

The linear block copolymers of this invention contain three polymer block segments made from conjugated dienes having 4 to about 12 carbon atoms per molecule and vinyl-substituted aromatic hydrocarbons having no more than about 24 carbon atoms per molecule. The three block segments are joined together end to end such that a central polymer block segment B is between two end or terminal essentially homopolymer block segments A of the vinyl aromatic hydrocarbon. At least 45 weight percent of the total vinyl aromatic compound in the linear block copolymer should be in the terminal homopolymer blocks.

The preferred conjugated dienes which are used to prepare the linear block copolymers of this invention include 1,3 - butadiene, isoprene, and piperylene. Other conjugated dienes which can be used include 2,3-dimethyl-1,3-butadiene, 1,3 - octadiene, 3 - butyl-1,3-octadiene, 1 - phenyl - 1,3 - butadiene, and the like. The vinyl substituted aromatic hydrocarbons which can be employed include styrene, 1 - vinylnaphthalene, 2 - vinylnaphthalene, and alkyl, cycloalkyl, aryl, alkaryl and aralkyl derivatives thereof such as α-methylstyrene, 3-methylstyrene, 4-n-propylstyrene, 4 - cyclopentylstyrene, 3 - phenylstyrene, 2 - ethyl - 4 - benzylstyrene, 4 - p-tolylstyrene, and 3-dodecyl-1-vinylnaphthalene.

The linear block copolymers of this invention can be prepared by any method known in the art such as by the methods described in U.S. Pats. 3,287,333, 3,231,635.

The tackifier which is useful in this invention can be any of the resinous substances known in the art for enhancing the tack of adhesive compositions. Examples of some suitable tackifiers include rosin; dehydrogenated rosin, rosin plus polyterpene resins, e.g., polymerized beta-pinene (from 100 percent rosin to 100 percent resin); hydrogenated rosin esters of glycerol; hydrogenated rosin esters of pentaerythritol; coumarone-indene resins; hydrogenated rosin; esters of polymerized rosin and glycerol; maleic anhydride-modified rosin and rosin derivatives; partial esters of styrene-maleic acid copolymers; chlorinated biphenyls; oil-soluble phenol-aldehyde resins; and the like.

The adhesive composition of this invention should be dissolved or dispersed in an organic solvent prior to application to a surface. The solvent reduces the viscosity of the adhesive composition and serves to wet the surfaces of the materials to be bonded together. Although any organic solvent which is inert toward the other components of the mixture can be used, the preferred solvents are saturated aliphatic, saturated cycloaliphatic and aromatic hydrocarbons, e.g., pentane, 2 - methylpentane, hexane, 3-ethylhexane, heptane, octane, nonane, naphtha, cyclopentane, methylcyclopentane, cyclohexane, methylcyclohexane, benzene, toluene, xylene, and the like. Other liquid organic solvents can be used, e.g., halogenated hydrocarbons, ethers, ketones, esters, and the like. Mixtures of any of the foregoing solvents can be used with the adhesive compositions of this invention. Although the amount of solvent is not especially critical, the solvent generally will be used in an amount such as to provide a solution or dispersion containing about 40–90, preferably 60–85, weight percent solvent, with the remainder of the solution or dispersion comprising the first copolymer, the second copolymer, tackifier, and other substances which optionally can be present, e.g., pigments, wetting agents, antioxidants, curatives, reinforcing agents, fillers, and the like.

Formulations for use as pressure sensitive adhesives were prepared from blends of the copolymers useful in this invention as well as from other polymer blends for comparative purposes. In the preparation of each formulation the polymer blend and Pentalyn H tackifier were dissolved in a hydrocarbon solvent. The liquid formulation, whose viscosity was measured in some instances, was then spread on a suitable backing, such as polyester or poly(vinyl chloride) film, with a 0.006 inch Bird applicator, the adhesive-coated film was applied to a substrate, and the bonded assembly was allowed to dry at ambient temperature (about 25° C.) for 20–24 hours before evaluation. Tack, peel strength, and creep resistance were then determined as described below.

Tack.—A loop was formed from a 1 x 5-inch strip of the backing coated with the pressure-sensitive formulation. The ends were brought together and taped with 1-inch masking tape. This formed a free loop of 3 inches with a 1-inch tab at the top. The loop was clamped by the tab in the upper jaw of an Instron testing machine. A 2.5 x 3-inch plate for use as the substrate for the coated film, the plate being mounted on the crosshead, was raised at a rate of 20 inches per minute until it had contacted an area of approximately 1 square inch of the tape loop. At this point the crosshead was reversed and moved away at the same rate. The time from initial contact to final break was about 6 seconds. Under the conditions of this test the contact pressure exerted on the adhesive-substrate interface was extremely low, being of the order of 1.5 grams per square inch. The tack was measured at room temperature (about 25° C.) and expressed in pounds per inch width (p.p.i.w.).

Peel strength.—The method of ASTM D 1000–61 for pressure sensitive adhesive insulating tape was used with slight modification. One inch strips of adhesive-coated film were placed on 1.5 x 6-inch plates of the substrate and rolled once each way with a 4.5 pound rubber-coated roller. The strips were long enough that 5–6 inches extended past the end of the substrate plate. After the film had remained on the substrate for 15–25 minutes, the free end was pulled back, exposing approximately 1 inch of the substrate. The exposed portion of the substrate was clamped in the upper jaw of an Instron testing machine, and the free end of the film was doubled back and clamped in the bottom movable jaw. The film was thus stripped at an angle of 180 degrees and at a rate of 6 inches per minute (crosshead speed=12 inches per minute). The force necessary to strip the approximate center 4 inches of the tape was determined at room temperature (about 25° C.) by visually averaging with a straight line the stress-strain curve obtained on the autographic chart recorder. The height of the center of the line was taken as the average peel strength, expressed in pounds per inch width (p.p.i.w.).

Creep resistance.—A 2-pound weight was hung from a vertical 1-inch wide strip of adhesive-coated film overlapped 1 square inch on the substrate. With the weight attached at an angle of 178 degrees to the substrate, the time required for ⅛-inch slippage or for complete failure of the adhesive bond at a given temperature was recorded and expressed in hours.

EXAMPLES

The branched block copolymer designated "A" in Tables 1 and 2 which follow, was used in adhesive formulations 1, 4, 5, 6, and 7. These formulations are within the scope of the invention. Branched block copolymer "A" was prepared for use in each of the above formulations in accordance with the following recipe.

RECIPE FOR COPOLYMER "A"

|  | Parts by weight |
|---|---|
| Cyclohexane | 860 |
| 1,3-butadiene | 75 |
| Styrene | 25 |
| n-Butyllithium | 0.15 |
| Oxiron 2000 [a] | 0.5 |

[a] Liquid epoxidized polybutadiene with a pale amber color, a viscosity of 1800 poises at 25° C., a specific gravity of 1.01, an epoxy content of 9.0 percent (oxirane oxygen), and an epoxy equivalent of 177.

Polymerization was intiated adiabatically at 125° F. with only styrene and n-butyllithium present in the cyclohexane diluent. The polymerization was allowed to continue until the temperature dropped after an initial rise (about 7 minutes after initiation). Butadiene was then added, and polymerization was continued for a total of 1.65 hours, during which time the temperature peaked at 207° F. and dropped. Oxiron 2000 was then added and 1 part by weight of 2,6-di-tert-butyl-4-methylphenol per 100 parts of rubber was added as an antioxidant. The polymer was steam stripped, washed, and dried. The polymer contained 23.4 percent total styrene and 23.3 percent block polystyrene, and had a Mooney viscosity (MS-4 at 212° F., ASTM D 927-55T) of 100.

The block copolymer designated "B" in Tables 1 and 2 which follow, was used in adhesive formulations 1, 3, 4, 5, 6, and 7. Formulation 3 is not within the scope of the invention and was included for comparative purposes. Block copolymer "B" was prepared for use in each of the above formulations in accordance with the following recipe.

RECIPE FOR COPOLYMER "A"

|  | Parts by weight |
|---|---|
| Cyclohexane | 780 |
| 1,3-butadiene | 75 |
| Styrene | 25 |
| n-Butyllithium | 0.18 |

The butadiene and styrene were charged to a reaction vessel containing cyclohexane, followed by the addition of the n-butyllithium. After the mixture had been maintained at 50° C. for 17 hours, a benzene solution containing 5 weight percent isopropyl alcohol and 2 weight percent N-phenyl-2-naphthylamine was added. The amine served as an antioxidant. The solvent was removed, leaving as product a polymer containing 18 percent block polystyrene and having a Mooney viscosity (ML-4 at 212° F., ASTM D 927-55T) of 47.

The branched block copolymer designated "E" in Tables 1 and 2 which follow, was used in formulation 8 which is within the scope of the invention. Branched block copolymer "E" and linear block copolymer "D," both of which are readily available commercial preparations, were used to make formation 8 in accordance with the following recipe.

Five parts by weight Solprene 406 resin, a commercial branched block 1,3-butadiene:styrene copolymer containing 39.8 percent total styrene and 39.6 percent block polystyrene, and having a Mooney viscosity of 62, MS-4 at 270° F., ASTM D 927-55T, 5 parts by weight Kraton 101 resin, a commercial linear block 70:30, by weight, 1:3-butadiene:styrene copolymer having terminal polystyrene segments, and having a Mooney viscosity of 90, MS-4 at 270° F., ASTM D 927-55T, 6.7 parts by weight Pentalyn H tackifier, and 66.8 parts by weight toluene.

Formulation 2, comprising random copolymer designated "C" in Table 1 and 2 and linear block copolymer "D," is not within the scope of the invention. This formulation was included for comparative purposes. Copolymer "C," like copolymers "D" and "E" mentioned above, is a commercially available copolymer. Its identification is provided in Table 1 which follows.

Formulations 1–8 inclusive were all subjected to the above-mentioned tests of adhesive characteristics. The results of the tests, formulation recipes, discussion of results and related information are provided in Tables 1–4 and discussion which follows.

A summary of the contents of the various adhesive composition formulations used herein is presented in Tables 1 and 2:

TABLE 1

Polymer type schedule

Designation: Description
- A ---- Branched block copolymer of 1,3-butadiene and styrene prepared according to receipe for copolymer "A."
- B ---- Block copolymer of 1,3-butadiene and styrene prepared according to recipe for copolymer "B."
- C ---- Random copolymer of 1,3-butadiene and styrene commercially available as "Solprene 300," a commercial random 75:25 (by weight) 1,3-butadiene:styrene copolymer.
- D ---- Linear block copolymer of 1,3-butadiene and styrene commercially available as "Kraton 101."
- E ---- Branched block copolymer of 1,3-butadiene and styrene commercially available as "Solprene 406," a commercial branched block copolymer.

Table 1 is a schedule of polymer types used in the experiments. It will be noted that the polymer types employed include branched block copolymers, block copolymers, random copolymers, and linear block copolymers; it will also be noted that these polymer types are assigned the letter designations A, B, C, and D respectively. It is also to be noted that the polymer type designated as E is also a branched block copolymer. This copolymer is not included under the A designation simply because it was not prepared according to the exact same recipe as was the A copolymer, however, the copolymers A and E, both being branched block copolymers, were similarly prepared.

TABLE 2.—FORMULATION OF ADHESIVE COMPOSITIONS

| Formulation No. | Polymer combination, parts by weight/polymer | Polymer ratio, parts by weight, polymer to polymer | Tackifier,[2] parts by weight | Adhesive composition ratio, parts by weight, polymer combination to tackifier[2] | Solvent for adhesive composition, parts by weight | | Solvent concentration, percent by wt. | | Solution viscosity at 25° C., cps. |
|---|---|---|---|---|---|---|---|---|---|
| | | | | | Naphtha[1] | Toluene | Naphtha[1] | Toluene | |
| 1 | 6/A + 4/B | A/B=1.5/1 | 6.7 | 1.49/1 | 66.8 | | 80 | | 39,040 |
| 2 | 4/C + 6/D | D/C=1.5/1 | 6.7 | 1.49/1 | 66.8 | | 80 | | ([3]) |
| 3 | 4/B + 6/D | D/B=1.5/1 | 6.7 | 1.49/1 | 66.8 | | 80 | | 2,500 |
| 4 | 6/A + 4/B | A/B=1.5/1 | 6.7 | 1.49/1 | | 66.8 | | 80 | |
| 5 | 6/A + 4/B | A/B=1.5/1 | 6.7 | 1.49/1 | 66.8 | | 80 | | 37,600 |
| 6 | 3.4/A + 1.6/B | A/B=2.13/1 | 7.5 | 0.67/1 | 50.0 | | 80 | | 8,800 |
| 7 | 3.4/A + 1.6/B | A/B=2.13/1 | 7.5 | 0.67/1 | 50.0 | | 80 | | |
| 8 | 5/E + 5/D | E/D=1.0/1 | 6.7 | 1.49/1 | | 66.8 | | 80 | |

[1] ASTM precipitation grade, B.P. 135–225° F.
[2] Hydrogenated rosin ester of pentaerythritol, "Pentalyn H"®, Hercules Powder Co.
[3] Incompatible.

Table 2, "Formulation of Adhesive Compositions," can be construed as a continuation of Table 1. Table 2 lists the eight different polymer formulations used in experimental testing herein. Table 2 lists for each formulation: the type copolymer combination employed according to the letter designation schedule of Table 1; the copolymer parts by weight and weight ratios employed; the particular type of tackifier, its parts by weight, and its weight ratio with the copolymer combination; and the particular type of solvent, its parts by weight, and its percent concentration in the adhesive composition. Table 2 also lists the viscosity of certain of the adhesive compositions.

Specifically regarding Table 2 the following preliminary experimental results can be observed. Of the eight formulations, formulations two and three are not within the scope of the invention, and these formulations are used as basis for comparison with formulations 1, 4, 5, 6, 7 and 8, which are within the scope of the invention. Formulations that do not contain a branched block copolymer—herein designated "A" and "E"—and those which do contain a random copolymer—herein designated "C"—are not within the scope of the invention. Although there is no specific formulation listed for a composition comprising a branched block copolymer and a random copolymer, such a composition is not within the scope of the invention. Notice that formulation 2, comprising a random copolymer and a linear block copolymer, forms a composition whose components are incompatible and from which it is concluded that such compositions are not usable as adhesives. Accordingly, further testing of formulation 2 was not undertaken. Notice that formulation 3, comprising a block copolymer and a linear block copolymer, did form an adhesive composition which did provide basis for comparison as will be noted from Table 4. Notice that formulation 4, comprising a branched block copolymer and a block copolymer, and formulation 8, comprising a branched block copolymer and a linear block copolymer, involved the use of toluene as a solvent. These formulations did form adhesive compositions, and the test results indicating the effect of solvent changes on adhesives within the scope of the invention are seen in Table 4.

A summary of the experimental results obtained in the various adhesive tests conducted on formulations 1, 3, 4, 5, 6, 7, and 8 are given in Tables 3 and 4.

TABLE 3

Film-substrate system schedule

Designation: Description
- 1–A — Poly(ethylene terephthalate) film and stainless steel substrate.
- 2–B — Poly(vinyl chloride) film and wood substrate.
- 2–A — Poly(vinyl chloride) film and stainless steel substrate.
- 2–C — Poly(vinyl chloride) film and polyethylene substrate.
- 2–D — Poly(vinyl chloride) film and flame treated polyethylene substrate.
- 2–E — Poly(vinyl chloride) film and painted wood substrate.
- 3–A — Aluminum foil film and stainless steel substrate.

Table 3 is a schedule of film-substrate systems utilized in the experiments. A particular combination of film and substrate is designated by a number and letter combination. Notice that three film types—poly(ethylene terephthalate), poly(vinyl chloride), and aluminum foil, designated by the numbers 1, 2, and 3 respectively—and five substrate types—stainless steel, wood, polyethylene, flame treated polyethylene, and painted wood, designated by the letters A, B, C, D, and E respectively—were used in 7 different combinations to illustrate the wide utility of the adhesive compositions of this invention.

TABLE 4.—ADHESIVE CHARACTERISTICS OF ADHESIVE COMPOSITIONS

| Formulation | Film-substrate system | Tack at 25° C., p.p.i.w. | Peel strength at 25° C., p.p.i.w. | Creep resistance at— | | | | | |
|---|---|---|---|---|---|---|---|---|---|
| | | | | 85° C. | | 70° C. | | 125° C. | |
| | | | | Hrs. | Inches | Hrs. | Inches | Hrs. | Inches |
| 1 | 1–A | 0.61 | 5.16 | 23 | 0.125 | | | | |
| 3 | 1–A | 0.99 | 4.55 | 5.55 | 0.125 | | | | |
| 6 | 1–A | 0.43 | 4.5 | 16 | 0.125 | | | | |
| 5 | 2–A | 6.6 | | | | | | | |
| 6 | 2–A | 12.0 | | | | | | | |
| 5 | 2–B | | 4.3 | | | 2.25 | 1.00 | | |
| 6 | 2–B | | 4.5 | | | 1.13 | 1.00 | | |
| 7 | 2–C | | 7.0 | | | | | | |
| 7 | 2–D | | 10.0 | | | | | | |
| 7 | 2–E | | 8.7 | | | | | | |
| 4[1] | 1–A | 0.31 | 2.6 | 17.5 | 0.125 | | | | |
| 8[1] | 1–A | 0.3 | 4.0 | | | | | | |
| 8[1] | 3–A | | | | | | | 1.25 | 0.125 |

[1] Toluene solvent.

Table 4, "Adhesive Characteristics of Adhesive Compositions," presents the experimental results and ties together the data presented in Tables 1, 2, and 3. The proper use of Table 4 requires a thorough appreciation of the number and letter designations provided in Tables 1 and 3 and frequent reference to the compositions given in Table 2 in order to grasp the significance of the data presented in Table 4.

The most significant result to be drawn from Table 4 is found in comparing formulations 1, 2, and 3. It will be recalled that formulations 2 and 3 are not within the scope of the invention and that formulation 1 is within the scope. Formulation 2 is significant due to its absence. Its components, including a random copolymer, were not compatible thus excluding it and others of like composition from being considered as an adhesive composition. Formulation 1 is distinguishable over formulation 3 by its significant superiority in creep resistance. Formulation 1 also exhibits greater peel strength with satisfactory tack.

Formulation 6, in combination with film-substrate 1-A, also exhibits superior creep resistance when compared with formulation 3. Formulation 6 also exhibits a change in adhesive characteristics which may be caused by varying the copolymer and the tackifier ratios.

Formulation 4 also exhibits a change in adhesive characteristics which may be caused when an adhesive composition such as formulation 1 is varied by the type of solvent employed. It is to be noted, however, that in spite of the decrease in tack, peel strength, and creep resistance with respect to formulation 1, the creep resistance of formulation 4 with respect to that of formulation 3 was still far better.

Formulations 5, 6, 7, and 8 demonstrate the versatility of the adhesive composition of this invention for use with different film-substrate systems. It is seen that the adhesive composition of this invention can be used to bond polymeric film to metal, to wood, to other polymers, and to paint. It is also seen that by using the product of this invention one can bond metal to metal.

Reasonable variations and modifications, which will be apparent to those skilled in the art, can be made in this invention without departing from the spirit or scope thereof.

We claim:
1. A four-component adhesive composition comprised of:
(1) a branched block copolymer represented by the general formula

$$Z(-CD)_n$$

wherein D is a terminal block segment consisting essentially of polymer formed from vinyl-substituted aromatic hydrocarbon units which comprise 5 to 60 percent by weight of said branched block copolymer, C is a block segment consisting essentially of polymer formed from conjugated diene units which comprise 40 to 95 percent by weight of said branched block copolymer, Z is derived from a polyfunctional compound having at least three reactive sites, and $n$ is an integer not less than 3;
(2) a second copolymer formed from vinyl-substituted aromatic hydrocarbon units which comprise 10 to 60 percent by weight of said second copolymer and conjugated diene units which comprise 40 to 90 percent by weight of said second copolymer, said second copolymer being one selected from a block copolymer or a linear block copolymer wherein said block copolymer is represented by the general formula

AB wherein A is a block segment consisting essentially of a homopolymer of a vinyl-substituted aromatic hydrocarbon and B is a block segment consisting essentially of a copolymer of a conjugated diene and a vinyl-substituted aromatic hydrocarbon, and said linear block copolymer is represented by the general formula

ABA wherein each A is a block segment consisting essentially of a homopolymer of a vinyl-substituted aromatic hydrocarbon and B is a block segment selected from the group consisting of a homopolymer of a conjugated diene and a copolymer of a conjugated diene and a vinyl-substituted aromatic hydrocarbon;
(3) a resinous tackifier; and
(4) an organic solvent which is inert toward said branched block copolymer (1), said second copolymer (2), and said resinous tackifier (3); wherein the weight ratio of said branched block copolymer (1) to said second copolymer (2) is in the range of about 0.05:1 to about 20:1, and the weight ratio of the combination of said branched block copolymer (1) and said second copolymer (2) to said tackifier (3) is in the range of about 0.05:1 to about 20:1.

2. The adhesive composition of claim 1 wherein said organic solvent is selected from saturated aliphatic, saturated cycloaliphatic, and aromatic hydrocarbons and further wherein the concentration of said solvent in said adhesive composition is in the range of about 40 to 90 percent by weight.

3. The adhesive composition of claim 2 wherein each of said block segments of said branched block copolymer is made from at least one of the monomers selected from the group consisting of conjugated dienes having from 4 to 12 carbon atoms per molecule and monovinyl-substituted aromatic compounds having 8 to 24 carbon atoms per molecule, wherein said terminal block segments D comprise said monovinyl-substituted aromatic compound to the extent of at least 5 percent by weight of said branched block copolymer, and wherein less than 20 percent by weight of each of said terminal block segments D is said conjugated diene.

4. The adhesive composition of claim 3 wherein said second copolymer is said block copolymer, wherein said block segment B is a copolymer of a conjugated diene having 4 to 12 carbon atoms per molecule and a vinyl-substituted aromatic compound having 8 to 24 carbon atoms per molecule, and wherein said block segment A is a homopolymer of a vinyl-substituted aromatic compound having 8 to 24 carbon atoms per molecule.

5. The adhesive composition of claim 3 wherein said second copolymer is said linear block copolymer wherein said block segment B is a homopolymer of a conjugated diene having 4 to 12 carbon atoms per molecule, said block segment B being sandwiched between said block segments A which are both homopolymer blocks of said vinyl-substituted aromatic compound.

6. The adhesive composition of claim 3 wherein said branched block copolymer comprises 75 percent by weight 1,3-butadiene and 25 percent by weight styrene, said second copolymer is said block copolymer comprising 75 percent by weight 1,3-butadiene and 25 percent by weight styrene, said tackifier is a hydrogenated rosin ester of pentaerythritol, and said solvent is naphtha.

7. The adhesive composition of claim 5 wherein said branched block copolymer comprises 75 percent by weight 1,3-butadiene and 25 percent by weight styrene, said tackifier is a hydrogenated rosin ester of pentaerythritol, and said solvent is naphtha.

References Cited

UNITED STATES PATENTS

| | | | |
|---|---|---|---|
| 3,239,478 | 3/1966 | Harlan | 260—876 |
| 3,281,383 | 10/1966 | Zelinski et al. | 260—23.7 |
| 3,287,333 | 11/1966 | Zelinski | 260—83.7 |
| 3,519,585 | 7/1970 | Miller | 260—876 |

DONALD E. CZAJA, Primary Examiner

W. E. PARKER, Assistant Examiner

U.S. Cl. X.R.

161—216, 230; 260—19, 32.8, 33.2, 33.16, 33.8, 876, 880